Figure 1:
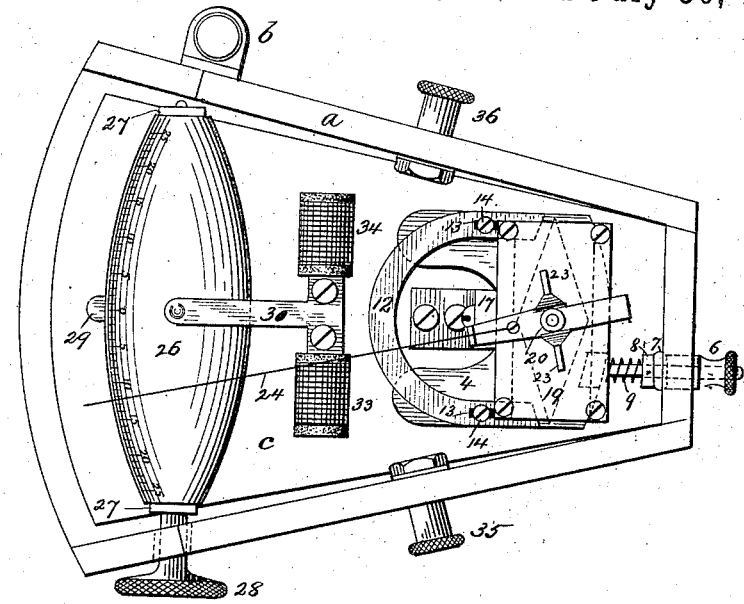

(No Model.)
2 Sheets—Sheet 1.

J. A. BARRETT.
ELECTRIC MEASURING INSTRUMENT.

No. 408,157.
Patented July 30, 1889.

WITNESSES:
J. H. Hundly
E. C. Grigg

John A. Barrett, INVENTOR

BY
McTighe & Worthington
ATTORNEYS (No Model.) 2 Sheets—Sheet 2.
J. A. BARRETT.
ELECTRIC MEASURING INSTRUMENT.
No. 408,157. Patented July 30, 1889.
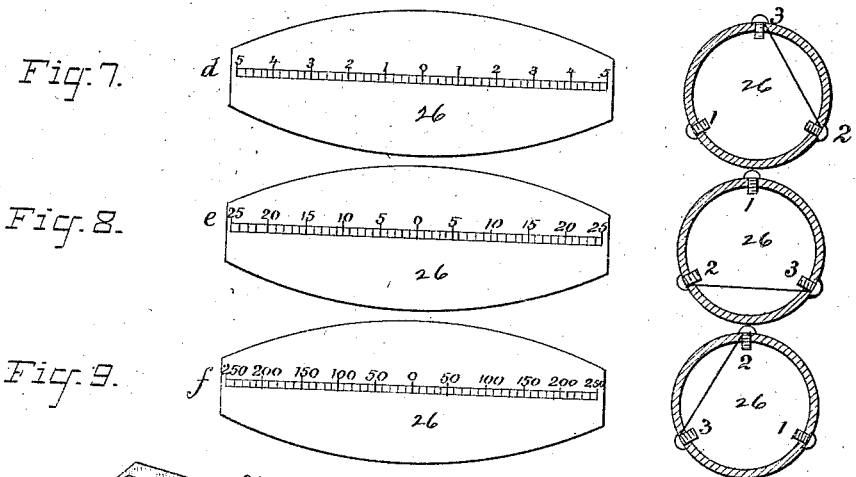
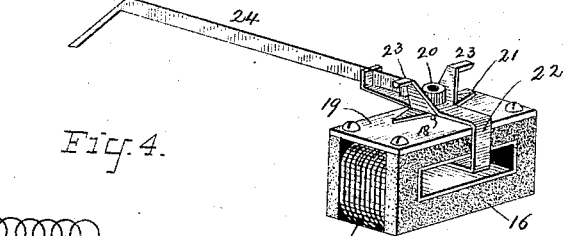
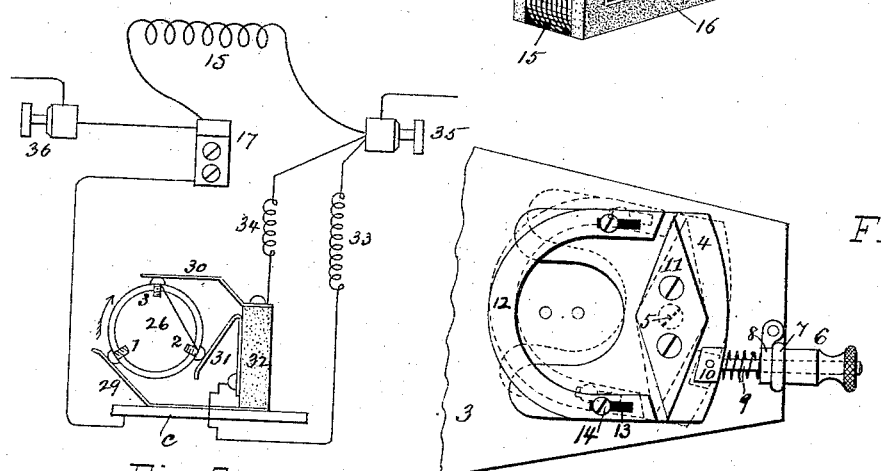
WITNESSES:
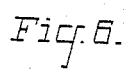
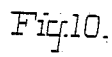
John A. Barrett,
INVENTOR
BY McTigher Worthington
ATTORNEYS
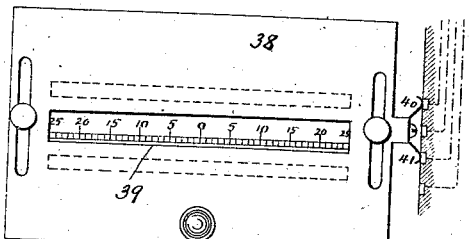

UNITED STATES PATENT OFFICE.

JOHN A. BARRETT, OF BROOKLYN, NEW YORK, ASSIGNOR TO THE JOHN A. BARRETT BATTERY COMPANY, OF BALTIMORE, MARYLAND.

ELECTRIC MEASURING-INSTRUMENT.

SPECIFICATION forming part of Letters Patent No. 408,157, dated July 30, 1889.

Application filed April 16, 1889. Serial No. 307,451. (No model.)

*To all whom it may concern:*

Be it known that I, JOHN A. BARRETT, a citizen of the United States, residing at Brooklyn, in the county of Kings and State of New York, have invented certain new and useful Improvements in Electric Measuring-Instruments; and I do hereby declare the following to be a full, clear, and exact description of the invention, such as will enable others skilled in the art to which it appertains to make and use the same.

This invention relates to the construction of electrical measuring-instruments in general, but is more particularly intended for use as a galvanometer for direct reading, although the invention is also applicable to other forms of electrical measuring-instruments.

One of the primary objects of my invention is to provide an instrument capable of reading according to two or more scales, and to so arrange the same that only one of the scales will be visible at any one time, and in order to render the other scale visible a movement of one of the parts will be necessary, and such movement is taken advantage of to simultaneously and automatically effect the movement of the shunting or equivalent devices which control the scale. An instrument of this character is much needed by those who desire to use the same, but are not sufficiently well versed in the use of the well-known forms of measuring-instruments to obtain accuracy in reading. It is also very desirable on the part of such persons—such as physicians—who in their practice need an instrument in the form of a millampèrometer to be able to directly read the volume of current flowing in the circuit which at the time they may be using, and as great variation may be required in such reading I have aimed to accomplish the result by the use of a galvanometer with one or more shunts in derivation therefrom and two or more scales which are graded to correspond, respectively, to the galvanometer alone and each of the shunts, and in order to prevent confusion I have arranged switching devices for said shunts to be under the control of the mechanism for determining which of the scales shall be used, so that when the desired scale is brought into view the proper connections for the galvanometer and shunts will be made accordingly without any further attention on the part of the user.

My invention will be best understood by reference to the following description and to the accompanying drawings, which form a part thereof, in which—

Figure 2:
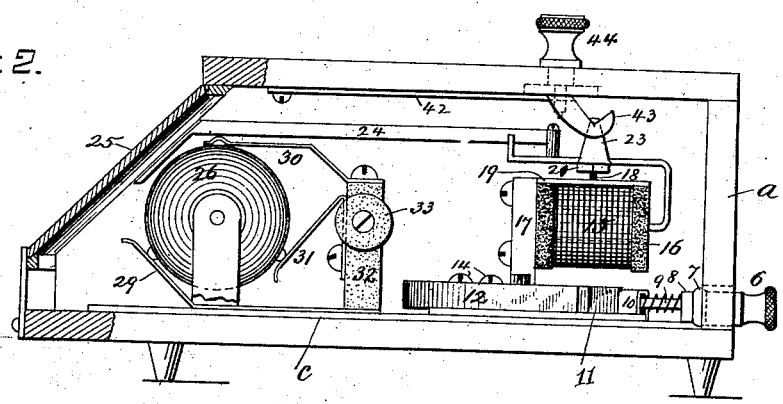
Figure 3:
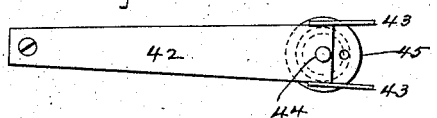

Figure 1 is a plan view with the cover removed; Fig. 2, a longitudinal elevation with one side removed, both views illustrating a physician's millampèrometer of the form in which I prefer to construct the instrument. Fig. 3 is a bottom view of the needle-lifter. Fig. 4 is a perspective showing the galvanometer-coil and needle-suspension device. Fig. 5 is a plan of the adjustable directing-magnet and the adjusting-armature therefor. Fig. 6 is a diagram of the connections. Figs. 7, 8, and 9 are each a front elevation and transverse section of the rotating scale, showing three different readings for its different positions and the relations of the contacts to one another in each of said positions; and Fig. 10 is a plan view of a modification illustrating another arrangement for effecting different readings and the simultaneous switching of the circuit of the instrument.

I construct the galvanometer proper as follows: In a suitably-shaped case $a$, which may be provided with one or more leveling-screws $b$, I fasten the bed-plate $c$. On this bed-plate I pivot a brass plate 4, its pivotal point being indicated at 5, which is in exact coincidence with the axis of the needle. I arrange the plate 4 so as to be capable of rotary adjustment around its pivotal point 5 by means of the adjusting-nut 6, which bears against a washer 7, which in turn bears against a lug 8, which is fixed on the bed-plate $c$, and through this lug 8 passes a threaded rod 9, which is fixed in a projection 10 on the swivel-plate 4. Between the projection 10 and the lug 8 the rod 9 is surrounded by a spiral spring, as shown, and the relations are such, preferably, that the adjusting-nut 6 projects out through the rear of the case $a$. Upon the swivel-plate 4, I rigidly fix the directing-magnet 11, having its center of figure in direct vertical line with the center of motion 5. As it is only intended and desirable for such purposes as this particular instrument is intended to have a very small amount of magnetism as the directive force, I place on the swivel-plate 4, so as to be carried with it, the U-shaped armature 12, which is arranged with its ends in proximity to the ends of the directing-magnet 11, and therefore the armature tends to produce a magnetic circuit for the lines of force of said magnet. This armature 12 is adjustable with reference to the directing-magnet, and as a simple means of adjustment may be constructed, as shown in Fig. 5, with slots 13 and clamping-screws 14. This construction of the armature 12 also provides for the calibration of the instrument, both when newly made and at any subsequent time.

The galvanometer-coil 15 is wound on a spool 16 of the usual form, and this is supported from the bed-plate $c$ by means of the standard 17, which passes down and is secured to the bed-plate $c$, as shown, the swivel-plate 4 being cut away to permit its movement without striking against the said standard. In order to give the greatest length possible to the needle-bearing 18, I place a metallic plate 19 across the top of the galvanometer-coil and fasten it thereto by means of screws or otherwise. This enables me to use a very deep bearing-cup 20 and still facilitate the removal of the needle at any time by merely taking out the screws which hold the plate 19 in position, and drawing it backwardly with the upper needle 21, to which the lower needle is attached by means of the extension 22, the system in this case being astatic. By this means the needle-bearing may be made so long that the needle cannot possibly be drawn off it so long as the plate 19 is in its position, since the drawing away of the plate 19 at the same time with the needle is essential to its removal from the coil. The needle 21 is attached to the strip of metal which carries cup 20, and this same strip has the two wings 23 bent upwardly and outwardly, as shown at Fig. 4, for the purpose of affording a lifting-point for the needle-lifter. The index consists of a long light aluminium strip 24, which projects out some distance from the coil and turns downwardly over the scale.

The front of the box is closed by a curved glass cover 25, which I prefer to etch or grind at all points except the narrow slit or window directly in front of the scale-line on the rotary scale-barrel 26. The latter I prefer to form of hard wood or other similar material, covered with a shell of white celluloid, having the three scales engraved along a line at three equidistant points of the circumference, the three scales being marked, respectively, $d\ e\ f$ in the drawings. The barrel 26 is curved from end to end, the curvature corresponding with the center of oscillation of the needle—namely, a line passing vertically through the point 5. The scale-barrel 26 is journaled in the standards 27, which rise from the bed-plate, and at one end a thumb-piece 28 projects outwardly through the case $a$. At its center the scale-barrel 26 has three contact-pins or screw-heads, respectively 1, 2, and 3, and the contacts 2 and 3 are directly connected together through the barrel by a wire or other convenient means of connection. A contact-spring 29 is fixed directly to the bed-plate $c$, so as to project outwardly under the front of the barrel 26, and at points, respectively, one hundred and twenty degrees in each direction from this, so as to bear on the remaining contacts at the time that one of them has touched the spring 29, are two separate springs 30 and 31, which are respectively fixed on the standard 32 of insulating material. The standard 32 also forms a convenient point of attachment for the shunt-coils 33 and 34, as shown at Figs. 1 and 2. The line of the scales on the barrel 26 is made to stand half-way between the contacts 1, 2, and 3, and one of the springs—for instance, the spring 30—is arranged to act as a stop for the purpose of conveniently determining when all the springs are in contact with the respective screw-heads. For this purpose the spring 30 is bent or notched at the point over the vertical center of the barrel 26. The index 24 projects across and down over the front of the barrel, so as to stand in close proximity to the scale which may be at the time presented to view.

Thus constructed I arrange the circuits as follows: I fix the terminals 35 and 36 to the sides of the instrument, and from the positive terminal 35, I connect directly to the galvanometer-coil 15, and from the other end of the galvanometer-coil I carry a connection, first, to the metallic bracket 17, or the bed-plate $c$, and from this direct to the other or negative terminal 36. From the terminal 35, I connect to the shunt 33, and thence to the insulated contact-spring 31, and from the same terminal 35, I make a direct connection to the shunt 34, and from it to the contact-spring 30, already described. For the scale-divisions already mentioned the galvanometer-coil proper will have a certain fixed resistance, the coil 33 will have one-ninth of that resistance, and the coil 34 will have one ninety-ninth of the resistance of the said coil 15, so that for the three positions the readings will be as shown—namely, units, tens, and hundreds. On examination, now, of Fig. 6, taken in connection with the right-hand portion of Figs. 7, 8, and 9, it will be observed that when the scale-barrel is in the position shown at Fig. 6, which corresponds with Fig. 7, the two shunt-coils 33 and 34 are not in the working-circuit, and therefore the reading is that due directly to the galvanometer-coil alone. On now turning the scale-barrel one-third of a revolution the position will correspond with that in Fig. 8, at which time there will be also a shunt-circuit established through the shunt-coil 33, spring 31, internal connection and spring 29, thence to the bed-plate $c$, and out at the terminal 36. This of course gives a deflection on the needle corresponding to the amount of current flowing through the galvanometer-coil, which in this case, being shunted by a coil or other device of much lower resistance, will be smaller than the deflection given in the case just described. Therefore the scale shown at Fig. 8 would be used. On again turning the scale-barrel 26 another one-third of a revolution the position will be as indicated at Fig. 9, at which time the shunt-circuit will be closed through the resistance or shunt coil 34, since in that case spring 30 will be on contact 2, which is connected to contact 3, and this in turn will be closed against the spring 29, whence the circuit will go to the bed-plate c, and thence out at the terminal 36. In this case the deflection due to the galvanometer-coil will be still smaller than before for a given current through the instrument, and therefore the scale shown at Fig. 9 is used.

By the foregoing construction and arrangement of the scales it is obvious that but one scale is visible to the user at one time, and when that scale is visible the proper connections have been made through the circuits of the instrument for making the reading correct by such scale, and if the scale be changed and another one brought into view the circuits of the instrument are at the same time changed into the condition for giving correct readings by the scale thus brought into view. It is therefore impossible for the user to go wrong in taking readings from such an instrument, whether the construction of the instrument is such as to fit it for use as a milliamperometer, a voltmeter, ammeter, or other instrument. It is evident that a variety of means for adjusting the swivel-plate 4 may be used, and the same is true of the adjustable U-shaped armature 12. It is also evident that the shunts which are used in connection with the galvanometer-coil may be constructed in various ways within the knowledge of one skilled in the art. Obviously, also, the particular form of the device carrying the different scales may be modified without departing from the spirit of this invention. As an instance, I have shown in Fig. 10 a flat plate carrying three different scales, and this covered by the sliding plate 38 with a window or slot 39, which can expose only one of the scales at a time, and in order to change to another of the scales under it the cover-plate must be moved in the proper direction. In so moving the cover-plate it is made to close the spring-contacts at 40 and 41, according to its position, the position for one scale corresponding to the galvanometer-coil alone, being as shown in the figure, and contacts 40 and 41 being closed at the respective positions to which the plate may be set, and when the plate is so set the spring-contacts will be closed, and one of the shunt-coils accordingly brought into parallel circuit with the galvanometer-coil.

On the under side of the top of the case a, I attach by one end a spring-blade 42, having at its free end the hook-shaped lugs 43, and I pass through the cover of the case a thumb-screw 44, which is provided with a washer 45 on the under side of the cover, the washer 45 rotating with the screw. The free end of the blade 42 is threaded to receive the end of the screw 44. In putting the parts together the hooks 43 are passed under the wings 23 of the needle, and when the instrument is not wanted for use the position will be as shown in Fig. 2, wherein the screw 44 has been turned so as to draw up the spring-blade 42, and by means of the hooks 43 the needle has been lifted free from its bearing, and no harm can come to the socket. When the instrument is to be used, the screw 44 is rotated, so as to force the blade 42 downwardly, thus lowering the needle onto its bearing.

I claim as my invention—

1. An electric measuring-instrument provided with an index or pointer and its deflecting-coil, two or more scales adapted for use separately therewith, and a cover or shield arranged to permit the exposition of only one scale at a time.

2. An electric measuring-instrument provided with an index or pointer and its deflecting-coil, two or more scales adapted for use separately therewith, a cover or shield arranged to permit the exposition of only one scale at a time, and means for simultaneously exposing one scale and controlling the current through said deflecting-coil.

3. In an electric measuring-instrument, the combination, with a needle and its deflecting-coil, of two or more scales and corresponding shunts, and means for mechanically bringing one of the scales into view and simultaneously connecting the appropriate shunt into the circuit.

4. In an electric measuring-instrument, the combination, with an index or pointer and its deflecting-coil, of two or more scales and corresponding shunts, and means for mechanically bringing one of the scales into view and connecting the corresponding shunt across the terminals of the deflecting-coil.

5. In a galvanometer having a deflecting-coil and one or more shunts therefor, the combination therewith of two or more scales, respectively corresponding to the deflections of said coil direct and shunted, and means for exposing only one of said scales at a time.

6. In a galvanometer having an inclosing-case provided with an opening or window, and having a deflecting-coil and an index therefor projecting in proximity to said window, the combination therewith of a scale-carrier adapted to manual rotation, so as to present different sides to the window, and having two or more scales on its surface.

7. In a galvanometer having an index or pointer, a deflecting-coil therefor and a shunt or shunts thereto, and a rotary scale-carrier adapted for manual rotation and having separate scales for the deflecting-coil and each shunt, in combination with circuit-closing devices connected to said coil and shunts and controlled by said rotating scale-carrier.

8. In a galvanometer, the rotating scale-carrier having two or more different scales located inside the case opposite a window or opening therein, and having two or more contacts, in combination with two or more switch-springs in the path of said contacts and forming the terminals of the shunts of the instrument, substantially as described.

9. In a galvanometer, a stationary deflecting-coil and deflecting-needle, in combination with a directing-magnet pivoted below the coil on the same vertical axis as the needle.

10. In a galvanometer, a stationary deflecting-coil and deflecting-needle, in combination with a directing-magnet provided with an independently-adjustable armature.

11. In a galvanometer, the combination of the stationary deflecting-coil 15, the cover-plate 19, applied to the upper surface of said coil and provided on top with the needle-bearing 18, with the two needles suspended on said bearing, one outside said coil and the other inside, and connected by the extension 22, the relation being such that the needles can be removed from the coil only by removing with them the cover-plate 19, as described.

12. In a galvanometer, the combination, with the magnetic needle having the wings 23, of the spring-blade 42, having the hooks 43 extending under the needle-wing 23 and adapted by upward pressure on the same to lift the needle from its bearing, said plate 42 being fixed at one end to the cover and at the other bearing in an adjusting-screw projecting through the cover.

In testimony whereof I affix my signature in presence of two witnesses.

JOHN A. BARRETT.

Witnesses:
GEORGE L. BETTS, Jr.,
GEORGE E. COMYNS.